Sept. 24, 1963  F. KLEIN  3,104,853
VERTICAL TAKE OFF AND LANDING AIRCRAFT
Filed June 5, 1961  2 Sheets-Sheet 1
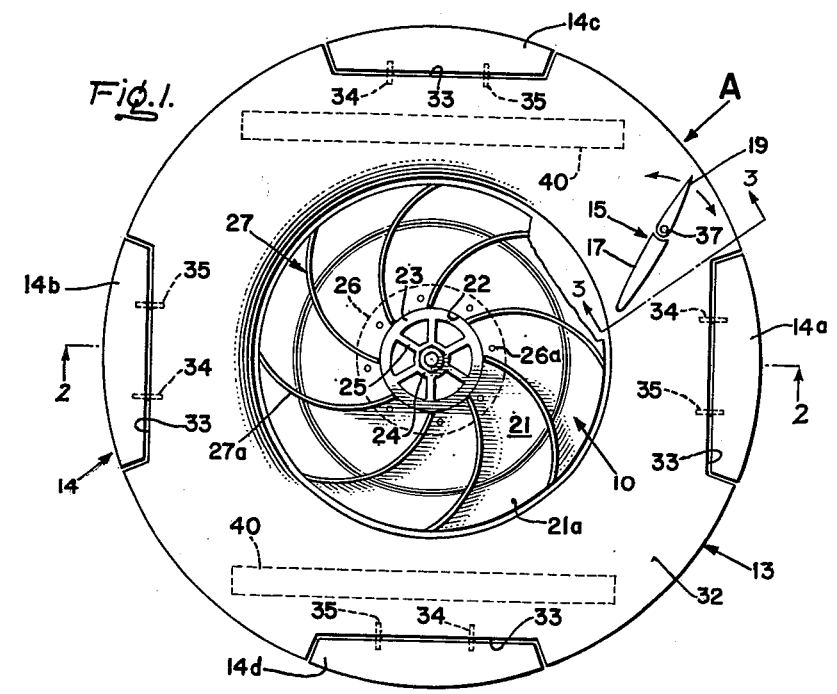
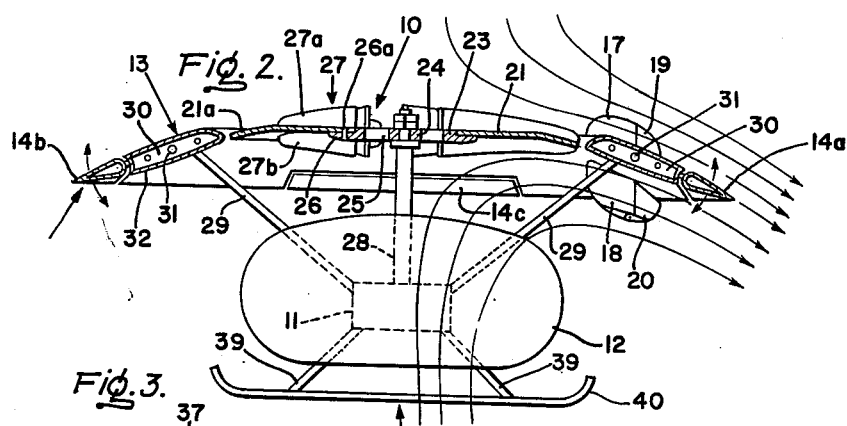
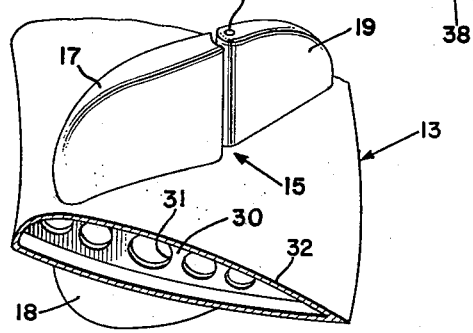
INVENTOR.
FRITZ KLEIN
BY
Hansen and Lane
ATTORNEYS.

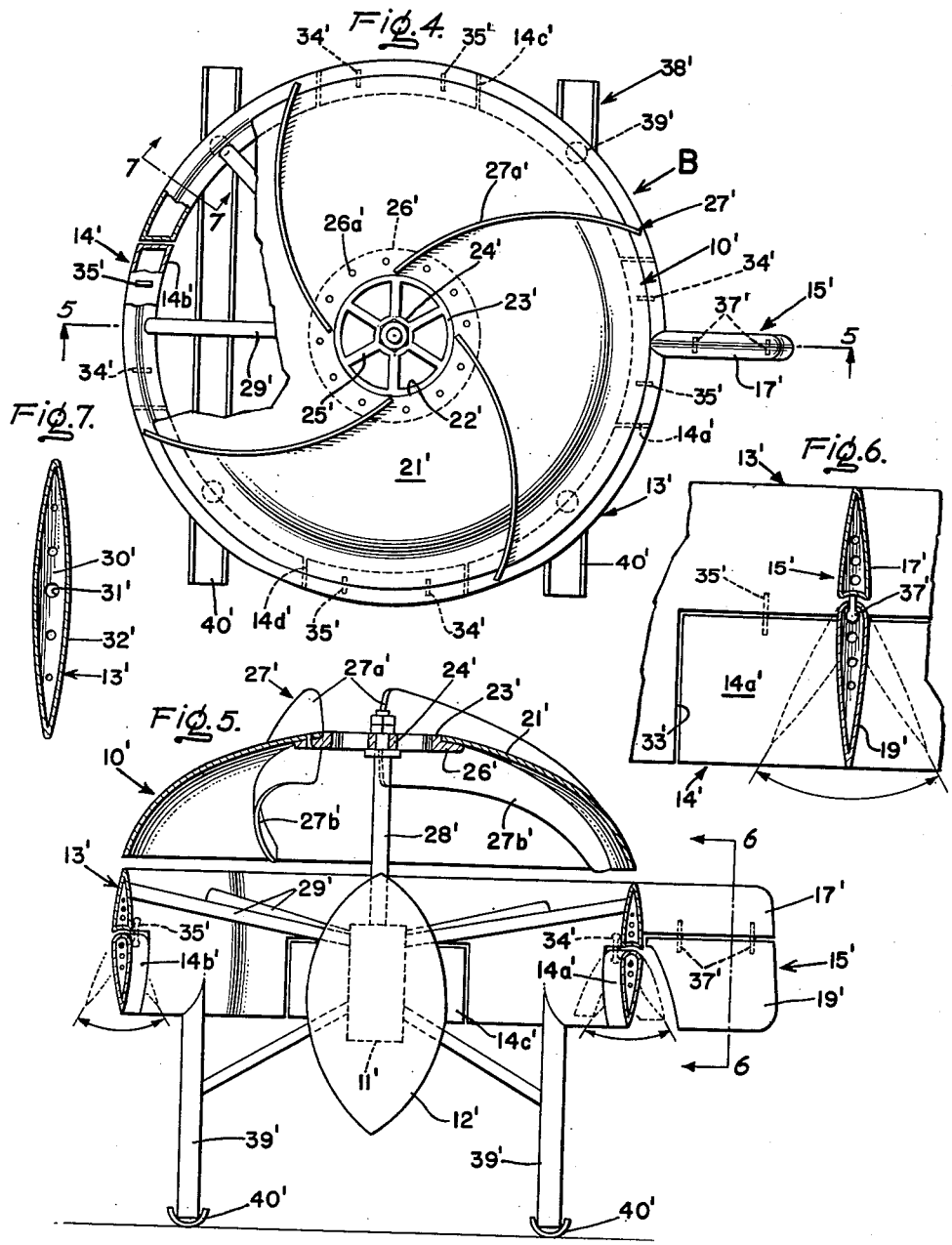

United States Patent Office 3,104,853
Patented Sept. 24, 1963

3,104,853
VERTICAL TAKE OFF AND LANDING AIRCRAFT
Fritz Klein, 14520 Debell Drive, Los Altos Hills, Calif.
Filed June 5, 1961, Ser. No. 114,862
3 Claims. (Cl. 244—12)

The present invention relates to aircraft, and pertains more particularly to a vertical take off and landing aircraft wherein the lifting effect is obtained by a centrifugal type impeller cooperating with an annular airfoil positioned in the path of the air discharged by the impeller.

At the present there are several different types of vertical take off and landing aircraft. The best known and most widely used type is the helicopter. Another is the propeller driven airplane with counter-rotating propellers which is designed to land and take off from a tripod-like support as the tail, and to swing from vertical to horizontal position for flight, and back to vertical position for landing. A third form is the so-called "flying platform" disclosed in Patent No. 2,953,321, wherein two counter rotating propellers are surrounded by a shroud ring, and the pilot stands on top.

The present invention contemplates the provision of a vertical take off and landing aircraft wherein a power driven centrifugal impeller, comprising a thin, sheet-like disk, open at the center and having a plurality of radial discharge impeller blades thereon, is surrounded by an annular airfoil. A peripheral portion of the disk preferably is curved downwardly to direct the air discharged by the impeller angularly downwardly, and the airfoil is positioned in the air stream discharged by the impeller to direct such air angularly downwardly, thereby to create a thrust reaction for exerting a powerful lifting force on the aircraft.

Another and very important object of the invention is to improve the power to lift ratio by an arrangement wherein the outflow velocity increment compared to the inflow velocity is directly beneficial to the lift created. This is not the case with any other known type of vertical takeoff and landing aircraft, for example, the helicopter.

Still another object of the invention is to provide an improved vertical take off and landing aircraft wherein a radial discharge, centrifugal impeller is positioned co-axially of an annular airfoil, the latter being positioned within the air stream discharged by the impeller to deflect such air stream downwardly and thereby create a reaction for exerting a powerful lifting effect on the aircraft.

These, and other objects and advantages of the invention, will be apparent from the following description and the accompanying drawings, wherein:

FIG. 1 is a diagrammatic, top, plan view of an aircraft embodying the invention.

FIG. 2 is a vertical sectional view taken along line 2—2 of FIG. 1.

FIG. 3 is a fragmentary, perspective view of a section through the airfoil taken as along line 3—3 of FIG. 1.

FIG. 4 is a diagrammatic, top, plan view of a modified form of the invention, portions being broken away.

FIG. 5 is a sectional view taken along line 5—5 of FIG. 4.

FIG. 6 is a sectional view taken along line 6—6 of FIG. 5.

FIG. 7 is a sectional view taken along line 7—7 of FIG. 4.

Briefly, an aircraft A embodying the present invention is shown somewhat diagrammatically in FIGS. 1–3, and comprises a centrifugal impeller 10 driven by suitable power means such as an engine, not shown, mounted in an engine compartment 11 in a nacelle 12. The impeller 10 is positioned co-axially within an annular airfoil 13 of substantially truncated conical shape, and of airplane wing type cross sectional configuration. A plurality of ailerons 14 are provided peripherally of the annular airfoil 13, and are actuated by conventional control means, not shown, to control the attitude of the aircraft A by acting on the air stream from the impeller 10 flowing past them.

Rotational control means 15 is provided for controlling rotative movement of the airfoil 13 and the remainder of the aircraft A by opposing the torque created by rotation of the impeller 10. The counter-rotative control means 15 comprises aligned upper and lower fixed stabilizer fins 17 and 18 projecting vertically from the upper and lower surfaces, respectively, of the annular airfoil 13 in the path of the air stream discharged by the impeller 10. A pair of pivotally mounted, rudder-like vanes 19 and 20 are mounted, respectively, on the radially outward or trailing edges of the stabilizer fins 17 and 18. Usual control mechanism, not shown, is provided for moving the pivotally mounted vanes 19 and 20 as required to oppose the torque of the impeller 10. The profile drag of the air stream from the impeller over the entire surface of the annular airfoil 13 also aids in opposing the torque of the impeller.

Referring to the drawings in greater detail, the impeller 10 comprises a disk portion 21 of sheet metal, for example, duralumin, with a central opening 22 therein, and a downturned portion 21a around the periphery thereof. The disk 21 is mounted co-axially on a central member 23, which comprises a hub portion 24, a plurality of radial spokes 25 and an annular rim portion 26. The latter is fitted concentrically within the central opening 22 of the disk 21 and is secured thereto by suitable means such as rivets 26a. This arrangement permits a free flow of air through the opening in the central member 23 which provides for a minimum of restrictive action on the air flow in this central eye zone of the impeller.

A plurality of identical impeller blades 27 are mounted in symmetrical arrangement on the disk 21. Each blade 27 consists of two portions, an upper portion 27a, and a lower portion 27b, secured in directly superposed, aligned relation to opposite sides of the disk 21. This blade arrangement facilitates balancing the impeller 10 and insures uniform radial discharge of the air therefrom.

The impeller 10 is secured in a conventional manner to the upper end of a power driven shaft 28, the lower end of which is operatively connected in a conventional manner by suitable gearing, not shown, to power drive means, such as, for example, an internal combustion engine, not shown, mounted in the engine compartment 11.

The annular airfoil 13 is mounted on a plurality of struts 29, secured in a conventional manner to the nacelle 12, and, as shown in FIG. 2, also to the engine compartment 11. The annular airfoil 13 is constructed in a manner conventional to airplane airfoil and wing construction, and comprises a required plurality of radially disposed web members 30, perforated by usual lightening holes 31, and covered with a suitable skin 32, which may be of duralumin. The skin 32 is attached to the webs 30 by suitable means, such as rivets, not shown. Due to the shape of the annular airfoil 13, and the stresses imposed thereon in flight, the airfoil 13 can be constructed much lighter than an ordinary aircraft wing of comparable size.

The four ailerons 14 are similar to each other, and are fitted, with adequate clearance to permit required pivotal movement, into recesses 33 provided therefor in the periphery of the airfoil 13. Each aileron 14 is pivotally mounted on suitable hinge means, such as a pair of usual bracket hinges 34 and 35. If desired, these ailerons may be faired into the adjacent airfoil by conventional means, but since such fairing and the manner of applying it are well known, it will be unnecessary to illustrate or describe it herein.

The ailerons 14 are preferably operated reversely in pairs, that is when the aileron 14a is tilted upwardly relative to the airfoil 13, the diametrically opposite airfoil 14b will be tilted a corresponding angular distance downwardly. The same is true with respect to the other pair of opposed ailerons 14c and 14d. The ailerons may be operatively connected to a conventional control stick, not shown, or wheel and yoke, also not shown. Since such aileron control mechanisms and the manner of installing and operating them are well known, it will be unnecessary to illustrate or describe them herein.

In the rotational control means 15, one or more of which may be provided as required, the fixed stabilizing fins 17 and 18 are preferably mounted so as to be directed substantially into the air stream discharged by the impeller 10. These vertically positioned stabilizers 17 and 18 are secured to the airfoil 13 by well known means such as, for example, those employed to mount the vertical stabilizers on a conventional airplane. The pivotally mounted vanes 19 and 20 on the radially outward or trailing ends of the stabilizers 17 and 18, respectively, are preferably secured to a common pivot post 37, and are controlled by suitable means, not shown, which may be similar to the rudder controls of a conventional airplane. Since such control means and their manner of operation are well known, it will be unnecessary to describe them herein.

An undercarriage 38 comprises two pairs of landing struts 39 secured to the nacelle 12 and engine compartment 11, each pair thereof carrying a conventional landing skid 40 on their lower ends, which may be similar to those commonly used on the undercarriage of helicopters.

The operation of the aircraft is as follows:

When it is desired to take off, the pilot, not shown, enters the nacelle 12 in a conventional manner and starts the engine located in the engine housing 11. The engine is accelerated to create a high velocity air flow radially outwardly over and under the annular airfoil 13. The latter is disposed at a suitable angle of incidence relative to the air stream to develop maximum lift relative to the air flow over it. The slight downward inclination of the peripheral portion 21a of the impeller disk 21 gives an initial downward deflection to the radial air flow from the impeller 10, which deflection creates a resultant upward thrust on the impeller 10 for stabilizing purposes. To this upward thrust on the impeller is added the very substantial lift exerted by the airfoil 13 in the same general manner as that of the wing of a conventional airplane, but without requiring any forward motion of the aircraft to achieve it.

When the combined lift on the impeller 10 and the airfoil 13 overcomes the gravitational force acting on the aircraft, the latter rises. Up to the time of takeoff, the skids 40, resting on the ground or runway, prevent counter-rotation of the aircraft under the torque of the impeller 10. Thereafter, the action of the air stream from the impeller on the rotational control means 15, controlled as required by operation of the vanes 19 and 20, and aided, as mentioned previously herein, by the profile drag of the air stream on the annular airfoil 13, counteracts this torque.

When it is desired to move the airborne aircraft longitudinally, a desired pair of the ailerons 14, for example the ailerons 14a and 14b, are moved in opposite directions as explained previously herein, and thereby incline the airfoil 13 toward the side of the aileron 14b. This action produces a horizontal resultant component in the direction of the aileron 14b, and thus causes the aircraft to move in that direction.

Obviously, the aircraft of the present invention is not designed for speed, but it has great lifting power and stability. It is relatively inexpensive to manufacture, and can be operated with a minimum of instruction. Also, there is no down draft directly below the aircraft of FIGS. 1–3, so that this aircraft would have great utility as an "aerial hoist."

The axial air inflow to the impeller 10 is substantially symmetrical in both axial directions. Therefore, the outflow velocity of the air stream discharged radially by the impeller, which creates the lift on the aircraft, is drawn into the impeller from both axial directions, so that the lift effect is not decreased substantially by the air inflow into the impeller or by the attitude of the aircraft, as is the case, for example, with a helicopter.

In the modified form B of the invention shown in FIGS. 4–7 the arrangement and nomenclature of the various parts are generally similar to those of the aircraft A of FIGS. 1–3, and corresponding parts in FIGS. 4–7 will, therefore, be designated by the same reference numerals as those designating their counterparts in FIGS. 1–3, with the prime (′) added.

In the aircraft B of FIGS. 4–7 the impeller 10′ has the disk 21′ thereof of pronounced concavo-convex curvature with the concave side thereof downwardly, so that the air stream discharged therefrom will be directed downwardly at a much greater angle than that indicated in FIG. 2. The annular airfoil 13′ of FIGS. 4 and 5 is substantially cylindrical, and in its cross sectional configuration is faired substantially uniformly on both the inner and outer sides thereof.

Rotational control means 15′ is provided on the radially outward side of the airfoil 13′, and comprises a fixed stabilizing fin 17′ with a pivotally mounted vane 19′ on its trailing edge. Ailerons 14′ are provided similarly to those 14 shown in FIGS. 1 and 2, and both the ailerons 14′ and the control vane 19′ are controlled in a conventional manner as explained for the corresponding members of the aircraft A of FIGS. 1–3.

The flying procedure and general operating characteristics of the aircraft B shown in FIGS. 4–7 are generally similar to those of the aircraft A of FIGS. 1–3, with the exception that the entire lifting effect of the aircraft B is the result of downward deflection of the air by the impeller 10′, the annular airfoil 13′ exerting no lifting effect, and serving only to direct and channel the air stream, and to provide means for steering the aircraft. The aircraft B of FIGS. 4–7 also will create a much stronger down-wash than will the aircraft A of FIGS. 1–3 which will be important in some cases, for example, for applying insecticides, and for some military uses.

While I have illustrated and described a preferred embodiment of the present invention, and one modified form thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A vertical take off and landing aircraft comprising an annular airfoil, landing gear attached to the airfoil for supporting the aircraft in axially upright position while on the ground, a centrifugal impeller of a size to fit rotatably within the airfoil, the impeller comprising a thin, sheet-like disk having a central opening therein, and a plurality of radial discharge impeller blades secured to the disk with a portion of each blade above, and a portion thereof below said disk, power drive means supporting the impeller for power driven rotation co-axially within the airfoil, and with the peripheral portion of the impeller disk aligned substantially with a chord of the airfoil, whereby the air stream discharged by rotation of the impeller flows both over and under the airfoil, the trailing edge of the airfoil relative to an air stream created by rotation of the impeller being lower than the leading edge of the airfoil to create lift on the airfoil, a torque control surface mounted on the airfoil and substantially perpendicularly thereto for deflecting a portion of the air stream discharged by rotation of the impeller to control rotative movement of the airfoil about its axis, and a plurality of ailerons mounted on the airfoil and positioned in the air stream discharged by rotation of the impeller for controlling the attitude of the aircraft.

2. A vertical take off and landing aircraft comprising a substantially cylindrical airfoil, landing gear attached to the airfoil for supporting the aircraft in axially upright position while on the ground, a centrifugal impeller of a size to fit rotatably within the airfoil, the impeller comprising a thin, sheet-like disk, concavely curved throughout an arc of substantially 90°, and having a central opening therein, and a plurality of radial discharge impeller blades secured to the disk with a portion of each blade above, and a portion thereof below said disk, power drive means supporting the impeller for power driven rotation co-axially within the airfoil, and with the peripheral portion of the impeller disk aligned substantially with a chord of the airfoil, whereby the air stream discharged by rotation of the airfoil flows both over and under the airfoil, the trailing edge of the airfoil relative to an air stream created by rotation of the impeller being lower than the leading edge of the airfoil to create lift on the airfoil, a torque control surface mounted on the airfoil and substantially perpendicularly thereto for deflecting a portion of the air stream discharged by rotation of the impeller to control rotative movement of the airfoil about its axis, and a plurality of ailerons mounted on the airfoil and positioned in the air stream discharged by rotation of the impeller for controlling the attitude of the aircraft.

3. A vertical take-off and landing aircraft comprising; a substantially cylindrical airfoil, landing gear attached to the airfoil for supporting the aircraft in axially upright position while on the ground, a centrifugal impeller of a size to fit rotatably within the airfoil, the impeller comprising a thin, sheet-like disk, concavely curved throughout an arc of substantially 90°, and having a central opening therein, the peripheral portion of the impeller disk being curved downwardly to impart a downwardly concave shape to the disk, the chord of the airfoil being substantially tangent to the curve of such peripheral portion of the disk at its radial extremity, the disk having a central opening therein, a plurality of radial discharge impeller blades secured to the disk with a portion of each blade above, and a portion thereof below said disk, power drive means supporting the impeller for power driven rotation co-axially within the airfoil, the peripheral portion of the impeller disk being aligned substantially with a chord of the airfoil, whereby the air stream discharged by rotation of the impeller flows over both inner and outer surfaces of the airfoil, a torque control surface mounted on the airfoil and substantially perpendicularly thereto for deflecting a portion of the air stream discharged by rotation of the impeller to control rotative movement of the airfoil about its axis, and a plurality of ailerons mounted on the airfoil and positioned in the air stream discharged by rotation of the impeller for controlling the attitude of the aircraft.

References Cited in the file of this patent

UNITED STATES PATENTS

| 1,374,256 | Van Asperen | Apr. 12, 1921 |
| 2,801,058 | Lent | Sept. 30, 1957 |

FOREIGN PATENTS

| 691,627 | France | July 15, 1930 |